United States Patent [19]

Barbé et al.

[11] Patent Number: 4,755,137
[45] Date of Patent: Jul. 5, 1988

[54] PROCESS AND INSTALLATION FOR MAINTAINING THE LINING OF A FURNACE SHELL

[75] Inventors: Jacques Barbé, St. Etienne; Robert Vatant, St. Chamond, both of France

[73] Assignee: Clecim, Courbevoie, France

[21] Appl. No.: 939,917

[22] Filed: Dec. 9, 1986

[30] Foreign Application Priority Data

Dec. 13, 1985 [FR] France .................. 85 18512

[51] Int. Cl.⁴ .............................................. F27D 1/16
[52] U.S. Cl. ........................................ 432/3; 432/24; 432/156; 432/241
[58] Field of Search .................. 432/3, 76, 241, 156, 432/24

[56] References Cited

U.S. PATENT DOCUMENTS

| | | |
|---|---|---|
| 2,269,595 | 1/1942 | Miller .................................. 432/24 |
| 3,290,031 | 12/1966 | Maatsch et al. ..................... 432/156 |
| 3,312,544 | 4/1967 | McCready . | 
| 3,588,060 | 6/1971 | Hermans ............................. 432/24 |

Primary Examiner—Henry C. Yuen
Attorney, Agent, or Firm—Pollock, Vande Sande & Priddy

[57] ABSTRACT

A process and apparatus for maintaining the lining of a furnace shell (1) comprising a bottom and a side wall and supported by a floor (2). The shell (1) is composed of two parts adapted to be separated and constituting respectively a bottom (11) and a cooled side wall (12). The side wall (12) is supported directly on a work floor (2) and the bottom (11) on a support (5) movable vertically between an upper operating position of the bottom (11), in line with the side wall (12), and a lower position. After the bottom (11) has been lowered into the lower position, it is moved out of the axis (10) of the furnace to a maintenance station, from which a new bottom (11') is then brought into the lower position, in the axis (10) of the furnace, in order finally to be raised to the upper operating position. The invention applies particularly to arc melting furnaces for steel production.

10 Claims, 3 Drawing Sheets

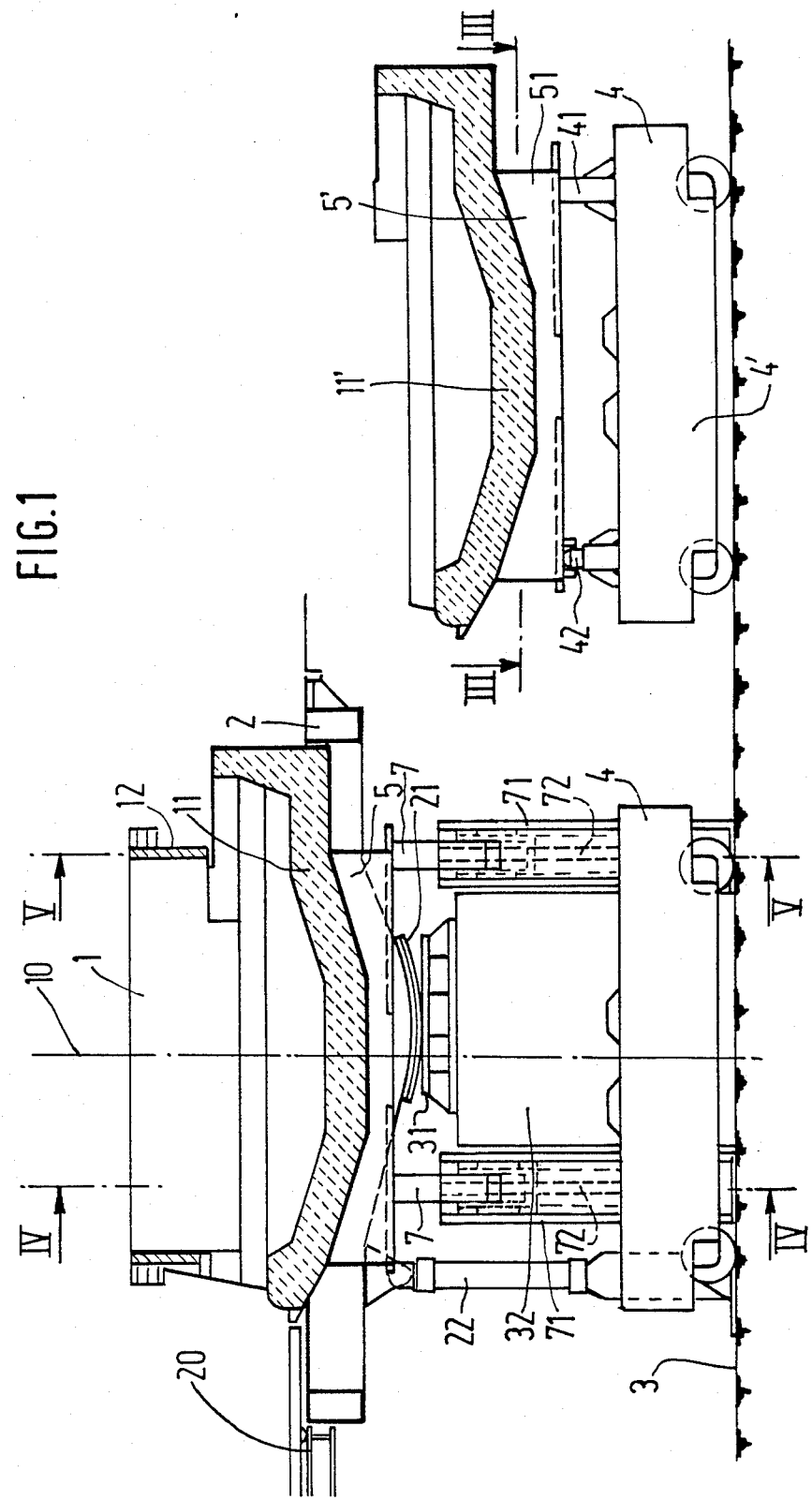

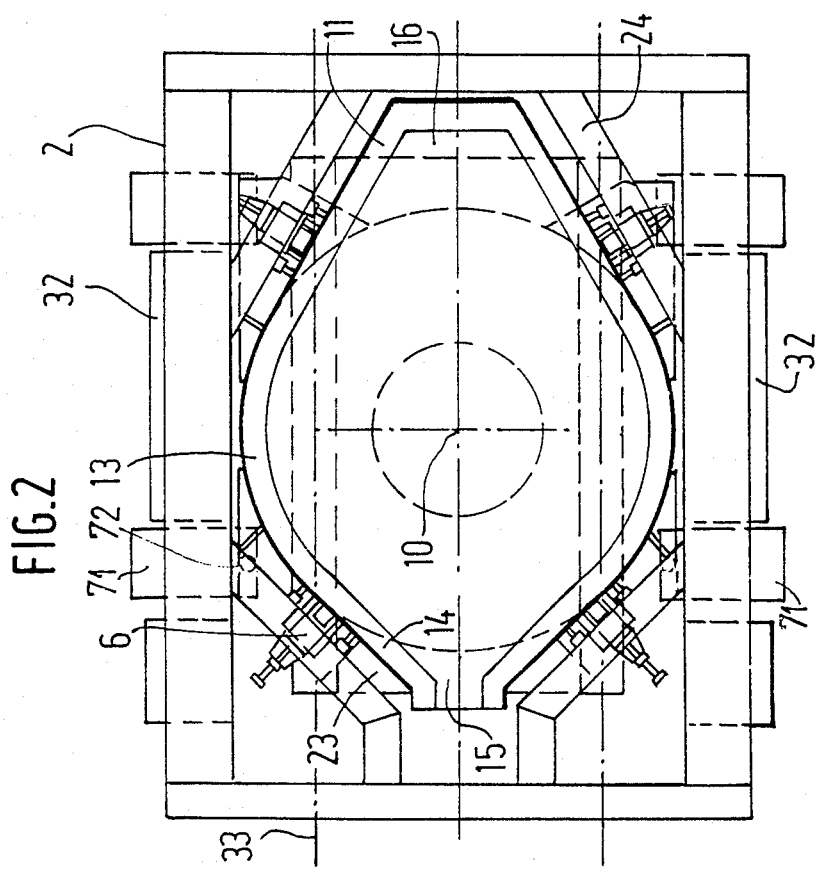

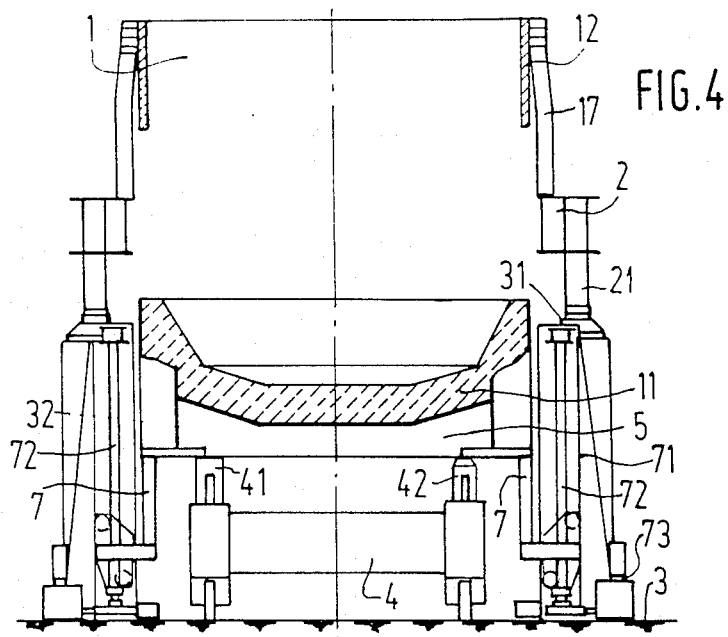
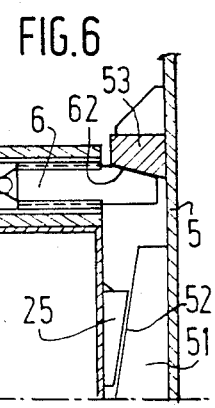
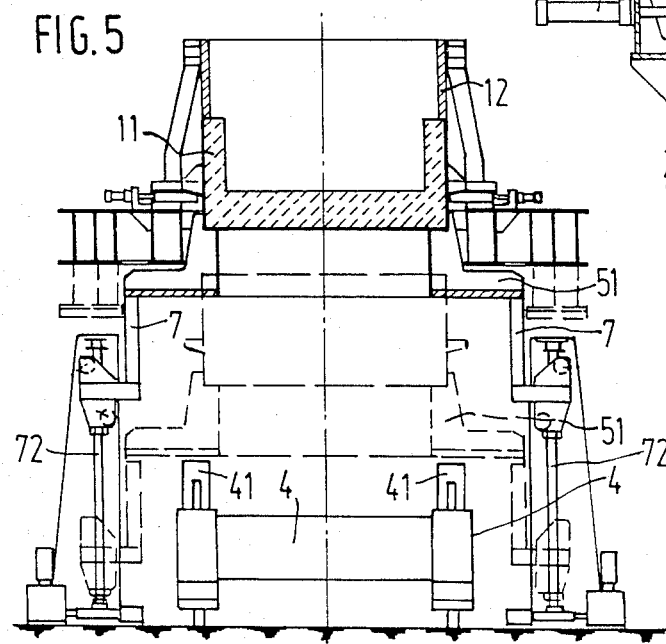

PROCESS AND INSTALLATION FOR MAINTAINING THE LINING OF A FURNACE SHELL

FIELD OF THE INVENTION

The invention relates to a process and an installation for maintaining the lining of a furnace shell, more particularly an arc furnace shell, and also relates to the improved shell for the application of the process.

BACKGROUND OF THE INVENTION

In electric arc furnaces, scrap iron is melted in a shell, which usually comprises a bottom and a side wall.

The shell is also provided with a cooling system, for example based on water circulation, but as a rule cooling is applied only to the side wall, because it would be difficult and even dangerous, on account of wear, to install a water circulation system inside the bottom.

Furthermore, after the iron scrap has been melted, the molten metal must be poured into a pouring ladle, and pouring is generally effected by slightly inclining the shell about a tipping axis. For this purpose the furnace shell is placed on a floor raised relative to the workshop floor on which ladle handling trucks circulate. The shell support floor is mounted for tilting about a horizontal axis, under the action of a jack, for example. Thus, once a ladle has been brought on its handling truck to a point near the shell, in the pouring position, pouring can be effected by slightly inclining the support floor and the shell by means of jacks.

The refractory lining is subject to considerable wear and must be periodically repaired or replaced. It has now been found that it would be helpful to be able to act directly on the bottom, which is more liable to wear than the side wall. Moreover, even when the repair is restricted to the bottom, this operation is very lengthy and requires a shutdown of the furnace and, in certain cases, of the entire steel works.

U.S. Pat. No. 3,952,140 discloses an electric arc furnace comprising a shell consisting of a plurality of sections, particularly a bottom and a side wall, these two parts being covered with a refractory lining.

Means for removing the different parts of the furnace, for the purpose of facilitating the replacement of the refractory lining, are placed above the plant, and this entails the removal of the side wall before the bottom can be reached.

SUMMARY OF THE INVENTION

The invention has as its object a process and apparatus for maintaining a furnace shell consisting of two parts adapted to be separated and respectively constituting the bottom and the cooled side wall, the whole arrangement being supported by a work floor, said process and apparatus making it possible to obviate this disadvantage and reduce to a minimum the shutdown time of the furnace for the replacement of the lining.

According to the invention, the side wall is supported directly on the work floor and the bottom on a support frame movable vertically between an upper operating position of the bottom in line with the side wall and a lower retracted position of the bottom, the movable frame passing into an aperture provided in the work floor and being fixed on the latter by detachable means, while, after the bottom has been lowered into the retracted position it is moved out of the axis of the furnace to a maintenance station from which a new bottom is then brought into the lower position in the axis of the furnace in order finally to be raised to the upper operating position.

In the retracted position, the bottom is advantageously deposited on a truck transporting the bottom, under the floor, between the retracted position and a maintenance station, one and the same truck preferably being used for transporting pouring ladles and for replacing the bottoms.

The invention also relates to the improved shell and to an apparatus for applying the process. According to the invention, the bottom is fixed on a movable support frame mounted for sliding along vertical guides extending above the work floor, between the latter and a lower floor, the work floor being provided with a central aperture whose section is greater than that of the bottom and into the interior of which the bottom can be introduced, and also being provided with detachable means for securing the bottom, while the installation includes means for raising and lowering the bottom along guides between an upper operating position on the work floor, in line with the side wall, and a lower retracted position, and with means for transporting the bottom between the lower retracted position and a maintenance station away from the furnace.

In the preferred embodiment, the means for transporting the bottom consist of at least one handling truck running on rails installed on the lower floor between a lower retracted position and a maintenance station.

According to another characteristic of the invention, the bottom raising and lowering means consist of at least two jacks bearing against supports mounted for sliding along guides and, when the truck is in the axis of the shell, taking up position below support legs adapted to rest on the one hand on the supports during the lowering and raising movements of the movable frame, and on the other hand, in the lower position, on feet provided on the handling truck.

BRIEF DESCRIPTION OF THE DRAWINGS

The invention will be better understood from the following description of one particular embodiment, given by way of example and illustrated in the accompanying drawings.

FIG. 1 is a view in vertical section on the line I—I in FIG. 2, passing through the longitudinal axis of the shell;

FIG. 2 is a plan view of the apparatus;

FIG. 3 is a view of the replacement bottom on its handling truck, in horizontal section taken on the line III—III in FIG. 1;

FIG. 4 is a view in vertical section on the line IV—IV in FIG. 1;

FIG. 5 is a view in vertical section on the line V—V in FIG. 1;

FIG. 6 is a detail view of the bottom securing device.

DESCRIPTION OF PREFERRED EMBODIMENT

FIG. 1 shows in longitudinal section a general view of the apparatus, which comprises an electric furnace shell 1 supported by a work floor 2, which is raised relative to the workshop floor 3 on which at least one handling truck 4 is adapted to run.

In accordance with a known arrangement, the work floor 2 of the shell can be inclined about a horizontal tilting axis for pouring purposes. To this end, the work floor 2 is in the form of a frame which takes up position in a corresponding opening in an operating floor 20 and which is supported, by means of rounded surfaces 21, on flat surfaces 31 provided at the top of two blocks 32 erected on each side of the axis 10 of the shell. The frame 2 is also supported on at least one jack 22 permitting control of a slight inclination of the floor 2 and therefore of the shell 1 about the horizontal pivot thus formed.

The work floor 2 is often provided with a central aperture in which the shell 1 is adapted to be received. However, in the case of the invention, this central aperture 23 has a section greater than that of the bottom of the shell 1. According to one characteristic of the invention, in fact, the shell 1 is composed of two separable parts, namely a bottom 11 and a side wall 12.

In conventional manner, the shell has in horizontal section the shape shown in the figure, comprising a rounded central portion 13 extended by convergent plane walls 14 constituting a front pouring portion 15 and a rear portion 16. The frame 2 will therefore be provided at its corners with inclined braces 24 parallel to the walls 14 of the shell, thus forming an aperture 23 of octagonal section greater than that of the shell. The latter can thus pass freely in the vertical direction inside the aperture 23, and it is locked in the upper position on the frame 2 by detachable locking means 6. For this purpose, while the side wall 12 of the shell is directly supported, through feet 17, on the work floor 2, the bottom 11 is fixed on a movable frame 5, which is shown in particular in FIGS. 3 and 5.

The movable frame 5 preferably has a circular outside section whose diameter substantially corresponds to that of a pouring ladle, and it is provided with four legs 51 which are supported on four vertically displaceable supports 7.

The supports 7 are in fact adapted to slide along vertical guides 71 extending in the space included between the work floor 2 and a lower floor, which consists in particular of the workshop floor 3 and on which a truck 4 can run. Electromechanical jacks 72 operated synchronously by motors 73 bear at one end against the floor 3 and at the other end against each of the sliding supports 7. It is thus possible to raise or lower the movable frame 5 of the bottom 11 between an upper operating position, shown in particular in FIGS. 1 and 5, in which the bottom 11 is placed in contact and in line with the bottom of the side wall 12, and a lower retracted position, shown in particular in FIG. 4, in which the movable support 5 comes to rest on the truck 4.

The truck 4 runs on rails 33 fixed on the workshop floor 3 and may consist of the pouring ladle handling truck, the rails being extended on one side to a bottom maintenance station and on the other side to the retracted position of the bottom placed between the support blocks 32 in the axis 10 of the shell and of the frame 2.

For the purpose of supporting the pouring ladles, the handling truck 4 is often provided with four feet 41, of which one, 42, is advantageously adjustable in order to provide perfectly stable support. The support legs 51 of the movable frame 5 are so shaped as to be able to be supported on the feet 41 of the truck 4, which can thus indiscriminately support pouring ladles or bottoms 11.

FIG. 6 shows in detail one of the means 6 for locking the bottom in the upper operating position.

The work floor 2 is provided with chocks 25 having wedge-shaped inclined faces which cooperate with correspondingly inclined locking faces 52 provided on the support legs 51 of the movable frame 5, in such a manner that the latter is perfectly held laterally when it reaches the upper operating position. In this position at least two bolts 6 mounted for radial sliding in corresponding apertures in the floor 2, and operated in synchronism by jacks 61, take up position under support stops 53 whose bottom faces are inclined in such a manner as to cooperate with inclined faces 62 provided at the ends of the bolts 6 in order to produce the locking action. In the upper operating position the support frame 5 for the bottom 1 is perfectly held on the work floor 2 by the wedges 25 and the bolts 6.

The installation therefore operates in the following manner:

When the bottom 11 of the shell is to be repaired, the furnace having been shut down and the work floor 2 brought horizontally in line with the operating floor 20, the supports 7 are raised with the aid of the jacks 72 until they take the load of the frame 5 and bottom 11, relieving the bolts 6 of load, a seal—which in any case is necessary for expansion purposes—being disposed between the bottom 11 and the side wall 12.

The bolts 6 can then be drawn back by means of the jacks 61, and the supports 7 are lowered, carrying with them the frame 5 and the bottom 11, the latter moving vertically downwards in the apertures 23 of the work floor 2.

The supports 7 are thus lowered until the frame 5 comes to rest with its legs 51 on the feet 41 of the handling truck 4, which had previously been brought into the retracted position, in the axis 10 of the shell.

The truck 4 carrying the bottom 11 needing repair is then moved away and brought to the maintenance station, while a new bottom 11', held waiting on another truck 4' near the frunace, is in turn brought into the lower position in the axis of the shell.

The supports 7 are then raised, take over the load of the movable frame 5' of the replacement bottom 11', and raise it to the upper operating position until it makes contact with the side wall 12. The bolts 6 are then placed in position to take over the load of the movable frame 5, and the supports 7 can be lowered since the new bottom is then supported by the floor 2.

During this entire operation it is possible to leave the side wall 12 in position and the cooling circuit does not have to be disconnected, so that it is possible for cooling to continue.

The same is true of all the equipment disposed on or around the shell, which can remain in position; this advantage can be extended to all the upper surrounding equipment of the furnace, such as spouts for additions, heating burners, injection lances for addition materials or gases, measuring instruments, and so on.

This is one of the important advantages of the invention because hitherto it was necessary to disconnect the cooling circuit and dismantle all auxiliary equipment for the purpose of replacing the shell, and this operation, which is rather delicate because of the temperature of the furnace, was very lengthy and not without danger, whereas according to the invention the entire operation is much simpler and faster, it being possible, for example, to replace a bottom in two or three hours.

From time to time it is obviously also necessary to replace the side walls, but, as has been indicated above, these replacements are much less frequent and repairs can moreover be made in situ fairly quickly because the side wall cooling system can remain in operation during the changing of the bottom.

Another advantage of the invention consists in that it requires no very substantial modifications of the installation, apart from the division of the shell into two parts, so that it can be applied to existing plants. The support floor is in fact usually already raised above the workshop floor, so that it is sufficient to modify it to permit the passage of the bottom and to install below it the means for raising and guiding the bottom. In addition, if they are suitably arranged, the pouring ladle truck and/or the slag ladle truck can be used as bottom handling truck, these trucks simply being equipped for this purpose and the tracks for these trucks simply being extended under the shell and to a maintenance station.

However, although it is advantageous to use these existing trucks, it would also be possible to use special trucks. Furthermore, it is obviously preferable to have available at least two handling trucks, although a single truck would be sufficient in more rudimentary installations.

While it would appear normal to move the bottoms on trucks, particularly if the latter already exist, other transport means, for example traveling cranes, can be contemplated.

Similarly, in the illustrated example the bottom 11 rests on a movable frame 5, but the means supporting it and locking it in the upper position may be disposed directly on the bottom if the construction and strength of the latter make this possible.

In addition, a conventional plant has been illustrated in which the support floor for the shell 1 and the operating floor 20 are raised relative to the workshop floor 3, which then forms the lower bottom handling floor. However, this lower floor could also be formed in a pit disposed below the support floor 2 if the latter were at workshop floor level.

Finally, the invention has been described in its preferred application to an arc melting furnace, but it could also be applied to other types of furnaces, such as tilting furnaces pouring either through a spout or through a nozzle, as well as to fixed furnaces.

We claim:

1. Process for maintaining the lining of a furnace shell consisting of two parts adapted to be separated and respectively constituting a bottom and a cooled side wall, said parts being covered with a refractory lining, the whole arrangement being supported by a work floor, including the steps of
   (a) supporting said side wall directly on said work floor and said bottom on a support frame movable vertically between an upper operating position of said bottom in line with said side wall and a lower retracted position of said bottom, said frame passing into an aperture provided in said work floor and being fixed on the latter by detachable means;
   (b) after said bottom has been lowered into said retracted position, moving it out of the axis of said furnace to a maintenance station;
   (c) bringing a new bottom from said maintenance station into the lower position in the axis of said furnace; and
   (d) raising said new bottom to said upper operating position.

2. Maintenance process according to claim 1, wherein, in the retracted position, said bottom is placed on a truck for transporting said bottom, below the floor, between the retracted position and a maintenance station.

3. Maintenance process according to claim 2, wherein at least two bottom handling trucks are used, one truck being placed in the retracted position under the furnace and the other truck being placed near the furnace and carrying a replacement bottom adapted to be placed in position immediately after withdrawal of a worn bottom.

4. Maintenance process according to claims 2 or 3, wherein the handling truck used is a pouring ladle truck and/or a slag ladle truck, said trucks simply being equipped for handling bottoms.

5. Metal melting installation located in a workshop having a lower floor and an operative floor which is raised relative to said lower floor, said intallation comprising
   (a) a shell constituted of two parts, namely, a bottom and a cooled side wall, adapted to be separated and covered by a refractory lining;
   (b) a work floor placed in a corresponding opening of said operative floor and supported on said operative floor by supporting means permitting a light inclination of said work floor about a horizontal axis;
   (c) a central aperture in said work floor and having a section greater than that of said bottom so that the latter can pass freely in the vertical direction inside said central aperture;
   (d) detachable locking means for removably locking said bottom on said work floor in an upper operating position in which said bottom is placed in contact and in line with said side wall, the latter being directly supported by said work floor;
   (e) a frame on which said bottom is fixed, said frame being vertically movable along vertical guides extending between said lower floor and said work floor;
   (f) means for raising and lowering said movable frame with said bottom between said upper operating position and a lower handling position; and
   (g) means for transporting said movable frame with said bottom between said lower handling position and a maintenance station away from the furnace.

6. Metal melting installation located in a workshop having a lower floor and an operative floor which is raised relative to said lower floor, said installation comprising
   (a) two support blocks located on each side of a vertical axis;
   (b) a work floor in the form of a frame placed in a corresponding opening of said operating floor and supported on said support blocks by supporting means permitting a slight inclination of said work floor about a horizontal axis;
   (c) vertical guides extending between said lower floor and said work floor;
   (d) a support frame vertically movable along said vertical guides;
   (e) a shell centered on said vertical axis and constituted of two parts covered by a refractory lining and adapted to be separated, said two parts being a fixed cooled side wall and a removable bottom, said cooled side-wall being directly supported by said work floor and said bottom being fixed on said support frame;
   (f) a central aperture provided in said work floor and having a section greater than that of said bottom so that the latter can pass freely in the vertical direction inside said central aperture;

(g) means for raising and lowering said support frame with said bottom between a lower handling position placed between said support blocks in the axis of the shell and of the support frame and an upper operative position in which said bottom is placed in contact and in line with said side wall;

(h) means for laterally holding and means for removably locking said bottom relative to said work floor in its upper operating position;

(i) at least one further bottom and one further support frame placed in a maintenance station; and (j) means for transporting said support frame with said bottom from said lower handling position to said maintenance station and for transporting said further support frame with said further bottom from said maintenance station to said lower handling position.

7. Metal melting installation according to claim 5 or 6, wherein said means for transporting said bottoms include at least one handling truck running on rails placed on the lower floor and extending between said lower handling position and said maintenance station.

8. Metal melting installation according to claim 5 or 6 wherein the detachable means securing the bottom comprise at least two bolts mounted for sliding radially on the work floor between a withdrawn position in which the aperture for the passage of the bottom is clear, and a locking position in which the ends of said bolts take up position under support stops fastened to the movable frame, the latter being provided with inclined support faces forming wedges and cooperating with corresponding wedges on the work floor in order to secure the movable frame laterally when the latter reaches the upper operating position.

9. Metal melting installation according to claim 7 wherein the trucks transporting the bottoms consist of trucks already provided for transporting pouring ladles and/or recovering slag, these trucks being provided with feet supporting the bottoms.

10. Metal melting installation according to claim 7, wherein said raising and lowering means consist of at least two jacks bearing against supports mounted for sliding along guides and, when the truck is in the axis of the shell, taking up position below support legs adapted to rest on the one hand on the supports during the lowering and raising movements of the movable frame, and on the other hand, in the lower position, on feet provided on the handling truck.

* * * * *